Patented Nov. 30, 1948

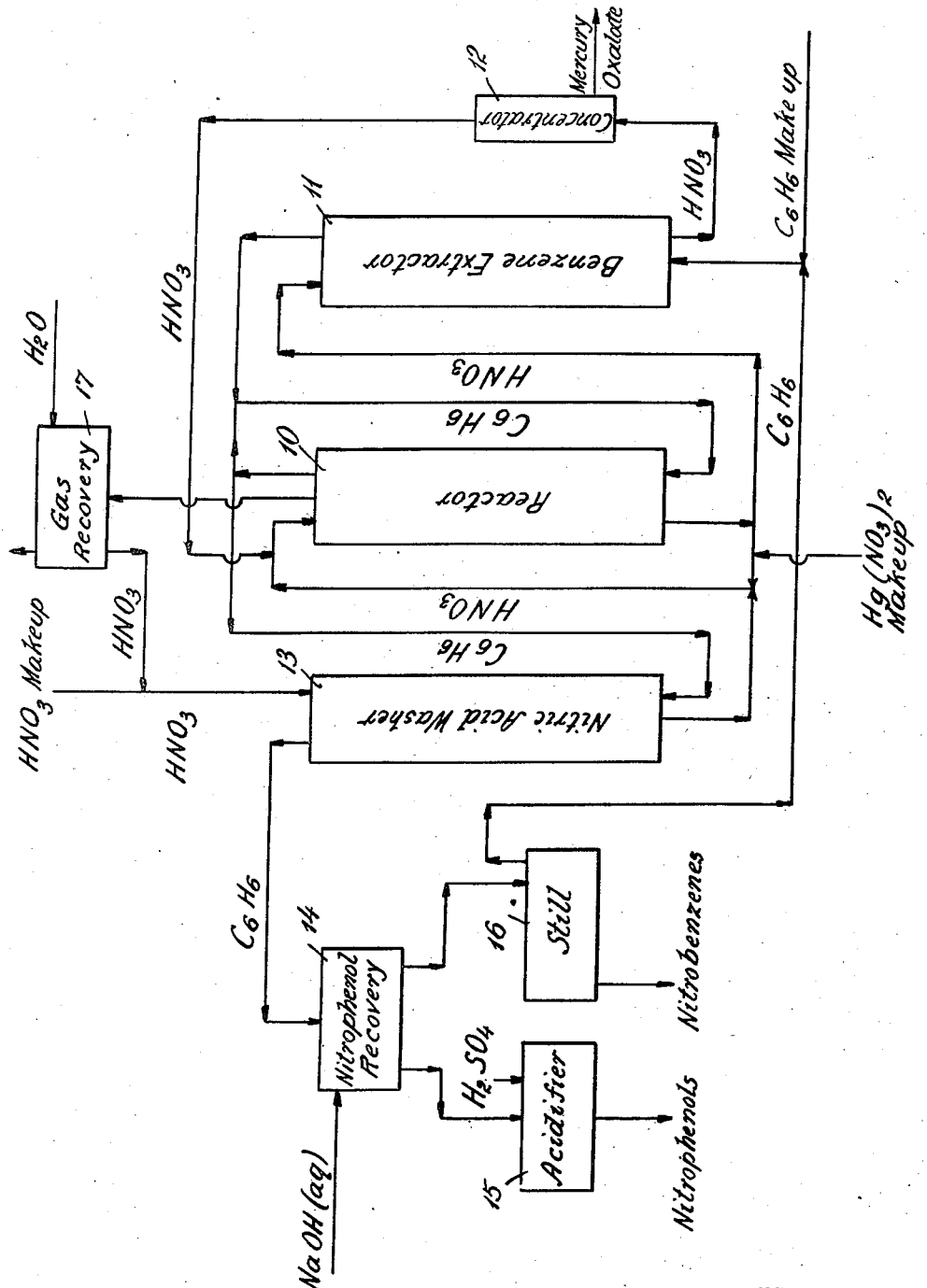

2,455,322

UNITED STATES PATENT OFFICE 2,455,322

OXYNITRATION OF AROMATIC COMPOUNDS

Wilber Otis Teeters, River Edge, and Max B. Mueller, Dumont, N. J., assignors to Allied Chemical & Dye Corporation, New York, N. Y., a corporation of New York Application September 16, 1944, Serial No. 554,532

8 Claims. (Cl. 260—622)

This invention relates to the oxynitration of aromatic compounds, particularly to the oxynitration of benzene.

Polynitrophenols, particularly trinitrophenol (picric acid), are in considerable demand at the present time. These compounds are usually manufactured by nitration of the corresponding phenol; however, phenols are also in great demand, so that a process whereby the desired netrophenols could be produced from a starting material other than the corresponding phenol would be of great value. It has long been known that polynitrophenols may be produced from benzene by reacting the benzene with dilute nitric acid in the presence of a mercury catalyst; thus Brewster Patent 1,380,185 of May 31, 1921, discloses the preparation of dinitrophenols by a process which involves mixing 50% nitric acid containing mercury dissolved therein with benzene at a temperature of about 50° C., withdrawing the reaction mixture to a cooler wherein the dinitrophenols are crystallized, recovering the dinitrophenols by filtration and returning the filtrate to the reaction vessel, a portion of the circulating acid being passed to a concentrator to maintain the acid concentration at the desired level. However, this process, to our knowledge, has not been employed on a commercial scale for the production of dinitrophenols, principally, we believe, because the yield of nitrophenols per unit volume of reactor space is of the order of 6.4 grams per hour per gallon of reactor space, a value too small for economical operation of the process.

It is an object of this invention to provide an economical process for the production of polynitrophenols by the oxynitration of aromatic compounds.

It is a more specific object of this invention to provide an economical process for the oxynitration of benzene.

We have discovered that the oxynitration of aromatic compounds having the structural formula:

in which Ar denotes an aromatic hydrocarbon residue, and X and Y denote members of the group consisting of hydrogen and alkyl substituents, may be carried out so as to produce high yields of polynitrophenols per unit volume of reactor space by bringing nitric acid, containing from 45% to 55% by weight HNO3 and from about 2% to about 10% by weight of mercuric nitrate, and the aromatic compound in the liquid phase into intimate countercurrent contact at a temperature between about 45° and about 55° C. and maintaining the reactants in countercurrent contact until the aromatic phase contains at least 10% by weight nitrophenols. The preferred embodiment of our invention involves oxynitration of benzene under the above specified conditions, whereby 2,4-dinitrophenol is obtained in excellent yields, which compound may readily be converted into the valuable picric acid. By operating under the conditions hereinabove specified, surprisingly high yields of polynitrophenols are obtained; for example in the oxynitration of benzene the yield of polynitrophenols is from 90 to 130 grams of polynitrophenols per hour per gallon of reactor space, a value far in excess of that heretofore obtainable. Furthermore, comparatively little direct nitration of the aromatic compound being treated occurs; in the oxynitration of benzene, for example, the weight ratio of nitrophenols to nitrobenzene in the product is of the order of 8 or 10 to 1.

In accordance with our invention oxynitration may be carried out on compounds having the structural formula

hereinabove described. Thus, benzene, toluene and xylenes may be treated in accordance with this invention. As hereinabove stated, the preferred embodiment of our invention involves the oxynitration of benzene; accordingly the operation of our invention will be described in terms of its application to the oxynitration of benzene, but it is to be understood our invention is not so limited.

In carrying out the process of our invention as applied to the oxynitration of benzene, we prefer to employ thiophen free benzene for reaction with the nitric acid, although other grades of relatively pure benzene may be used, if desired. The nitric acid should contain between about 45% and about 55% by weight HNO3, preferably about 50% HNO3. The acid should also contain between about 2% and about 10%, preferably between about 6.5% and about 7%, by weight of mercuric nitrate dissolved therein; such a solution may be formed by adding the appropriate amount of mercuric nitrate to the acid or by dissolving mercury in nitric acid of a strength such that consumption of acid by dissolution of the mercury will yield a solution containing between 45% and 55% HNO₃.

In accordance with our invention, the nitric acid and benzene reactants are brought into intimate countercurrent contact in a reaction vessel, which may be constructed of suitable nitric acid resistant material such as Pyrex glass, glass lined steel, or stainless steel. The nitric acid may be introduced into the vessel and heated to a temperature between 45° and 55° C., preferably about 50° C., before the benzene is admitted. After the nitric acid has reached reaction temperature, benzene may then be introduced into the bottom of the vessel and intimate countercurrent contact of the reactants commenced by withdrawing benzene from the top of the vessel and recirculating it to the bottom, and withdrawing nitric acid from the bottom of the vessel and recirculating it to the top, so that the benzene and acid flow in opposite directions and intimately intermingle with one another. It is highly important for the success of our invention that contact of the reactants be effected in this manner, since we believe that this feature contributes greatly to the surprising improvement in the yield of polynitrophenols per unit volume of reactor space obtained by us.

If the oxynitration is to be carried out batchwise, intimate countercurrent contact of the reactants is commenced as hereinabove described. The rate of circulation of benzene through the reactor depends chiefly upon the diameter of the reactor. We have found the linear velocity of benzene flow through any given reactor may suitably vary between about 16 and about 32 feet, e. g. about 24 feet, per hour. Nitric acid may be circulated through the reactor at a linear velocity of about 20 to about 80 feet, preferably about 80 feet, per hour. The weight ratio of acid to benzene may vary considerably, e. g. between about 2.5 and about 7, but preferably is between about 6.5 and 7. In accordance with the invention the reactants are repeatedly circulated through the reactor until the benzene layer contains at least 10%, and preferably from about 10% to about 20%, by weight polynitrophenols; at this point the strength of the acid has usually dropped by from about 2% to about 5%.

Continuous operation of the process of our invention may be commenced in a similar fashion to the batch process by introducing nitric acid containing the catalyst dissolved therein into the reactor, heating the acid to the desired reaction temperature, admitting the benzene and commencing countercurrent circulation of the acid and benzene. When the reaction has proceeded to a point such that the benzene contains from about 10% to about 20% by weight polynitrophenols, withdrawal of a portion of the circulating benzene is commenced for recovery of the nitrophenols therefrom as hereinbelow described; likewise withdrawal of a portion of the circulating acid is commenced, which acid is concentrated and returned to the reactor to prevent undue dilution of the acid by the water generated by the reaction. The rate of circulation of acid and benzene, the amounts of fresh reactants added and the amounts withdrawn from the circulating streams of reactants are so correlated that the nitric acid concentration in the reaction mixture is maintained relatively constant within about 1% or 2% of the initial acid concentration and the benzene withdrawn contains between about 10% and about 20% by weight polynitrophenols; the specific rates at which the benzene and nitric acid are circulated and the amounts added and withdrawn from the circulating streams will depend upon the amounts of the reactants involved in the particular process and may easily be ascertained from the above.

The methods for recovering the nitrophenols are substantially the same in either batch or continuous operation of our process. The nitric acid layer withdrawn from the reaction is washed with benzene to extract the small amount of polynitrophenols and nitrobenzenes contained therein and the benzene extract is added to the benzene layer. The nitric acid thus extracted may then be concentrated in any suitable manner and returned to the process; mercury oxalate which is formed during the reaction and separates from the nitric acid, particularly during concentration, may be removed from the acid by filtration prior to reuse thereof. The combined benzene layers are washed with nitric acid to remove mercury therefrom and then with water to remove excess nitric acid. The desired polynitrophenols are then extracted from the benzene with a dilute solution of an alkali metal hydroxide, e. g. sodium or potassium hydroxide, and the aqueous extract acidified to recover the desired polynitrophenols; the nitrophenols may then, if desired, be further nitrated with mixed acid to produce picric acid. The benzene from which the nitrophenols have been recovered may be separated from nitrobenzenes contained therein by fractional distillation and reused.

The nitrophenols may also be recovered from the acid washed benzene layer by steam distilling the benzene layer, whereby benzene and nitrobenzenes are removed in the distillate and the bulk of the nitrophenols left suspended in the aqueous residue, from which they may be recovered by filtration and dried. The steam distillate may be washed with a caustic soda solution to remove the small amounts of nitrophenols contained therein, then extracted with water to remove residual caustic and the benzene separated from the nitrobenzenes by fractionation.

The nitrophenols may also be recovered by adding ammonium hydroxide to the acid washed benzene layer with agitation to precipitate the insoluble ammonium salts of the nitrophenols; these salts may be separated by filtration, washed and then suspended in water and acidified to regenerate the desired nitrophenols.

The nitrophenols produced by the oxynitration of benzene in accordance with our invention consist chiefly of 2,4-dinitrophenol, although small amounts of picric acid are present; thus the product may contain from 85% to 95% by weight 2,4-dinitrophenol and 5% to 15% by weight picric acid. No detectable amounts of mononitrophenols have been observed. The nitrophenol-nitrobenzene weight ratio in our product is generally between 5:1 and 20:1.

The accompanying drawing diagrammatically represents a preferred embodiment of our invention involving continuous oxynitration of benzene. As shown in the drawing, benzene and 50% nitric acid containing 6.5% to 7% by weight mercuric nitrate dissolved therein are countercurrently contacted at 50° C. in reactor 10, nitric acid flowing downwardly through the vessel and being continuously withdrawn from the bottom of the vessel and recirculated to the top thereof, and benzene passing upwardly through the vessel and being continuously withdrawn from the top of the vessel and recirculated to the bottom; as shown in the drawing, mercuric nitrate may be added to the circulating stream of nitric acid to maintain the mercury concentration at the desired level. A portion of the nitric acid withdrawn from the bottom of the vessel is not recirculated but is passed to the top of benzene extractor 11 wherein it is countercurrently washed with benzene to remove nitrophenols therefrom; the benzene wash liquor is passed into the circulating stream of benzene for treatment in reactor 10. The nitric acid passes from benzene extractor 11 to concentrator 12 wherein it is concentrated and returned to reactor 10 for further use in accordance with the process; insoluble mercury oxalate may be separated from the acid during concentration.

A portion of the benzene solution of nitrophenols and nitrobenzene withdrawn from the top of reactor 10 is not recirculated but passes to the bottom of nitric acid washer 13 wherein it is counter-currently washed with 50% nitric acid to remove mercury contained therein, the nitric acid wash liquor being added to the circulating stream of nitric acid for passage to reactor 10. The solution of nitrophenols and nitrobenzene in benzene passes from washer 13 to nitrophenol recovery unit 14 wherein it is washed with aqueous sodium hydroxide to remove nitrophenols. The aqueous sodium hydroxide solution is then acidified with sulfuric acid in acidifier 15 and the nitrophenols which separate recovered. The benzene solution containing nitrobenzenes dissolved therein withdrawn from nitrophenol recovery unit 14 passes to still 16, wherein the nitrobenzenes are separated by distillation; the benzene from still 16 is returned to benzene extractor 11 where, combined with make-up benzene, it is employed to wash the nitric acid withdrawn from reactor 10. Reaction gases evolved from reactor 10, which consist mainly of nitrogen oxides, are oxidized to convert lower oxides of nitrogen to the higher oxides and the oxidized gases are washed with water in gas recovery unit 17, unabsorbed spent gas being discarded; the nitric acid formed by washing the gases with water is combined with make-up acid and employed to wash the benzene solution in nitric acid washer 13.

In connection with the process outlined in the drawing and described above, it should be noted that if a highly efficient reactor is employed so that benzene upon one passage through the reactor takes up from 10 to 20 weight percent nitrophenols, none of the benzene or acid withdrawn from the reactor need be returned thereto but the entire amounts may be passed directly to washer 13 and extractor 11, respectively.

Oxynitration or compounds having the type formula:

above defined proceeds in a manner entirely similar to the oxynitration of benzene above described. If a compound which is solid at the temperature of the reaction is to be treated, a solution thereof in a suitable inert solvent, e. g. an olefin free petroleum hydrocarbon mixture boiling within the range of 60° to 160° C., should be contacted with the acid.

The following examples are illustrative of our invention, Example 1 describing a continuous operation and Example 2 a batch operation.

*Example 1*

Benzene and a solution of nitrophenols and nitrobenzenes in benzene (obtained as hereinafter described) were introduced into the bottom of a tower 18 inches in diameter and 10 feet high, the benzene being introduced at the rate of 100 pounds per hour and the benzene solution at the rate of 6644 pounds per hour; nitric acid containing about 50% $HNO_3$ and about 7% mercuric nitrate was introduced at the top of the tower at the rate of 6124 pounds per hour, the acid passing downwardly through the tower countercurrent to the flow of benzene. The temperature of the tower was 50° C. Unreacted nitric acid was withdrawn from the bottom of the tower at the rate of 6040 pounds per hour and the major portion thereof, 5237 pounds per hour, was mixed with make-up nitric acid containing 50% $HNO_3$ and 7% mercuric nitrate, fed at the rate of 887 pounds per hour, and the mixture recycled to the top of the reactor. The minor portion of the nitric acid withdrawn from the reactor was countercurrently washed with benzene, the acid being fed to the washer at the rate of 803 pounds per hour and the benzene at the rate of 100 pounds per hour, to remove nitrophenols from the acid; the benzene wash liquor was then passed to the reactor. The washed nitric acid was then concentrated and used as make-up acid.

The benzene solution emerging from the top of the reactor contained nitrophenols and nitrobenzenes dissolved therein. The major portion of this solution was recycled to the bottom of the reactor at the rate of 6644 pounds per hour as described. However, 111 pounds per hour of the solution were withdrawn and washed countercurrently with 50% nitric acid, fed at the rate of 65 pounds per hour, to remove mercury contained therein; the nitric acid wash liquor was employed as make up acid. The acid washed benzene was washed with water and then treated with a 1% sodium hydroxide solution, whereby an aqueous solution of sodium nitrophenates was formed which separated from the benzene layer. The nitrophenols were recovered by acidifying the aqueous nitrophenate solution with 50% sulfuric acid and filtering; the mother liquor from the filtration was extracted with benzene to recover nitrophenols and the benzene extract was mixed with the benzene solution of nitrophenols to be extracted with sodium hydroxide.

The benzene from which the nitrophenols were recovered was washed with water to remove residual sodium nitrophenates and then distilled to recover the benzene. The nitrobenzene and dinitrobenzenes were recovered as residue.

By operating in accordance with this example nitrophenols were produced at the rate of 96.5 grams per hour per gallon of reactor space.

*Example 2*

Nitric acid containing 50% $HNO_3$ and 6.7% mercuric nitrate were introduced into a reaction vessel 2 inches in diameter and 3 feet 4 inches high provided with a side tube for withdrawing acid from the bottom of the vessel and recirculating the acid to the top thereof; circulation of the acid through the vessel and side tube at the rate of 50 liters per hour was then commenced and the circulating acid was heated until a temperature of 50° C. was attained. The temperature of the acid was then maintained at 50° C. and benzene was introduced at the bottom of the vessel so as to establish intimate countercurrent contact of the benzene and acid, the benzene being withdrawn from the top of the vessel and repeatedly recirculated to the bottom through another side tube provided for the purpose; the rate of flow of benzene was gradually increased to 15 liters per hour. Circulation of the acid and benzene were continued in this manner for three hours, at the end of which time the acid concentration had been reduced to 45% and the benzene contained 18% polynitrophenols in solution. The nitric acid and benzene layers were separated, the acid layer washed with benzene and the benzene wash combined with the benzene layer. The benzene solution was washed with concentrated nitric acid to remove mercury and then with water to remove excess acid. Nitrophenols were then extracted from the benzene solution with a 1% sodium hydroxide solution; the aqueous alkaline solution formed was acidified with 50% sulfuric acid until acid to Congo red and the precipitated nitrophenols recovered by filtration, washed with water and dried. The nitrophenol reaction product contained 90% 2,4-dinitrophenol, the balance being picric acid. The benzene solution from which the nitrophenols were recovered was analyzed for nitrobenzene; the analysis showed the nitrophenol-nitrobenzene ratio in the product was 10:1.

By operating in accordance with the example, nitrophenols were produced at the rate of 123 grams per hour per gallon of reactor space.

Since certain changes may be made in carrying out the above process without departing from the scope of the invention, it is intended that all matter contained in the above description shall be interpreted as illustrative and not in a limiting sense.

We claim:

1. A process for the oxynitration of benzene, which comprises intimately countercurrently contacting nitric acid containing from about 45% to about 55% by weight $HNO_3$ and from about 2% to about 10% by weight mercuric nitrate with benzene and maintaining the reactants in intimate countercurrent contact until the benzene phase contains at least 10% by weight nitrophenols.

2. A process for the oxynitration of benzene which comprises intimately countercurrently contacting nitric acid containing from about 45% to about 55% by weight $HNO_3$ and from about 2% to about 10% by weight mercuric nitrate with benzene at a temperature between about 45° and about 55° C., maintaining the reactants in intimate countercurrent contact until the benzene contains from about 10% to about 20% by weight nitrophenols and then recovering the nitrophenols produced.

3. A process for the oxynitration of benzene which comprises passing nitric acid containing about 50% by weight $HNO_3$ and from about 6.5% to about 7% by weight mercuric nitrate downwardly through a reactor countercurrent to a stream of benzene, so that intimate intermingling of the reactants takes place, the temperature of the reaction mixture being about 50° C., repeatedly circulating the acid and benzene through the reactor until the benzene contains between about 10% and about 20% by weight nitrophenols dissolved therein, separating the benzene solution from the unreacted acid, washing the acid with benzene, combining the benzene wash with the benzene solution, washing the combined benzene solutions with nitric acid and recovering nitrophenols from the benzene solution.

4. A process for the continuous oxynitration of benzene which comprises continuously countercurrently contacting nitric acid containing between about 45% and about 55% by weight $HNO_3$ and between about 2% and about 10% by weight mercuric nitrate with benzene, continuously withdrawing nitric acid and continuously withdrawing a benzene solution from the system, the rates of flow of nitric acid and benzene and the amounts introduced and withdrawn from the system being such that the benzene solution withdrawn contains dissolved therein between about 10% and about 20% by weight nitrophenols, and recovering nitrophenols from the benzene solution withdrawn.

5. A process for the continuous oxynitration of benzene which comprises continuously circulating nitric acid containing about 50% by weight $HNO_3$ and between about 6.5% and about 7% by weight mercuric nitrate through a vessel in countercurrent contact with a continuously circulating stream of benzene, so that intimate intermingling of the reactants takes place, the temperature of the reaction mixture being about 50° C., continuously withdrawing a portion of the circulating nitric acid and continuously withdrawing a portion of the circulating benzene solution, the rates of flow of nitric acid and benzene solution and the amounts introduced and withdrawn from the system being such that the benzene solution withdrawn contains dissolved therein between about 10% and about 20% by weight nitrophenols, washing the nitric acid withdrawn with benzene, combining the benzene wash with the benzene solution withdrawn, washing the combined benzene solutions with nitric acid and recovering nitrophenols from the washed benzene solution.

6. A process for the oxynitration of a mononuclear aromatic hydrocarbon which comprises intimately countercurrently contacting the aromatic hydrocarbon in the liquid phase with nitric acid containing from about 45% to about 55% by weight $HNO_3$ and from about 2% to about 10% by weight mercuric nitrate, and maintaining the reactants in intimate countercurrent contact until the aromatic phase contains at least 10% by weight nitrophenols.

7. A process in accordance with claim 6 in which the aromatic hydrocarbon reactant is a monoalkyl benzene.

8. A process in accordance with claim 6 in which the aromatic hydrocarbon reactant is a dialkyl benzene.

WILBER OTIS TEETERS.
MAX B. MUELLER.

REFERENCES CITED

The following references are of record in the file of this patent:

UNITED STATES PATENTS

| Number | Name | Date |
|---|---|---|
| 923,761 | Boeters | June 1, 1909 |
| 1,297,170 | Holley | Mar. 11, 1919 |
| 1,380,185 | Brewster | May 31, 1921 |
| 2,048,168 | Pollard | July 21, 1936 |